United States Patent
Nabeshima et al.

(10) Patent No.: US 11,985,529 B2
(45) Date of Patent: May 14, 2024

(54) WIRELESS LAN COMMUNICATION SYSTEM, ACCESS POINT COMMUNICATION QUALITY DETERMINATION METHOD, AND INFORMATION COLLECTION SERVER

(71) Applicant: Nippon Telegraph and Telephone Corporation, Tokyo (JP)

(72) Inventors: Masayoshi Nabeshima, Tokyo (JP); Hiroyuki Nakamura, Tokyo (JP); Tomoaki Ogawa, Tokyo (JP); Shinya Otsuki, Tokyo (JP); Makoto Umeuchi, Tokyo (JP); Junichi Iwatani, Tokyo (JP); Hiroshi Sakamoto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 421 days.

(21) Appl. No.: 17/287,181

(22) PCT Filed: Oct. 18, 2019

(86) PCT No.: PCT/JP2019/041192
§ 371 (c)(1),
(2) Date: Apr. 21, 2021

(87) PCT Pub. No.: WO2020/085252
PCT Pub. Date: Apr. 30, 2020

(65) Prior Publication Data
US 2021/0392535 A1     Dec. 16, 2021

(30) Foreign Application Priority Data

Oct. 24, 2018 (JP) ................................. 2018-200427

(51) Int. Cl.
*H04W 24/00* (2009.01)
*H04W 24/08* (2009.01)
(Continued)

(52) U.S. Cl.
CPC ........... *H04W 24/10* (2013.01); *H04W 24/08* (2013.01); *H04W 48/16* (2013.01); *H04W 84/12* (2013.01)

(58) Field of Classification Search
None
See application file for complete search history.

(56) References Cited

U.S. PATENT DOCUMENTS 9,264,954 B2 *  2/2016  Radulescu ........ H04W 36/0085
2006/0234720 A1  10/2006  Takizawa et al.
(Continued)

FOREIGN PATENT DOCUMENTS

JP    2006-295788    10/2006
JP    2013-78083     4/2013
(Continued)

OTHER PUBLICATIONS

Wifi-tokyo.jp, [online], "How to use FREE Wi-Fi & Tokyo," 2015, retrieved on Sep. 20, 2018, retrieved from URL<http://www.wifi-tokyo.jp/ja/mail.html>, 13 pages (with English Translation).

*Primary Examiner* — Gerald A Smarth
(74) *Attorney, Agent, or Firm* — Fish & Richardson P.C.

(57) ABSTRACT

A plurality of access points configured to communicate with a subordinate wireless LAN terminal, an information collecting device configured to collect a frame respectively transmitted and received between the plurality of access points and the wireless LAN terminal, and extract information on communication quality of an access point of the plurality of access points from a header of the frame, and an information collecting server configured to acquire the information on the communication quality of the access point from the information collecting device, analyze the information to determine whether the communication quality is good or bad for each of the plurality of access points, and (Continued)

execute processing of externally displaying or notifying a result that is determined are included.

11 Claims, 6 Drawing Sheets

(51) Int. Cl.
*H04W 24/10* (2009.01)
*H04W 48/16* (2009.01)
*H04W 84/12* (2009.01)

(56) References Cited

U.S. PATENT DOCUMENTS

| | | | | |
|---|---|---|---|---|
| 2010/0267378 | A1* | 10/2010 | Hamabe | H04W 36/305 |
| | | | | 455/423 |
| 2011/0032832 | A1* | 2/2011 | Jalali | H04W 28/02 |
| | | | | 370/312 |
| 2015/0156704 | A1 | 6/2015 | Umetsu | |
| 2018/0242178 | A1 | 8/2018 | Barton et al. | |

FOREIGN PATENT DOCUMENTS

| | | | | |
|---|---|---|---|---|
| WO | WO 2013/187071 | | 12/2013 | |
| WO | WO-2014081080 A1 * | 5/2014 | | H04W 24/04 |
| WO | WO 2017/208440 | | 12/2017 | |
| WO | WO-2020151802 A1 * | 7/2020 | | H04L 47/2433 |

* cited by examiner

WIRELESS LAN COMMUNICATION SYSTEM, ACCESS POINT COMMUNICATION QUALITY DETERMINATION METHOD, AND INFORMATION COLLECTION SERVER

CROSS-REFERENCE TO RELATED APPLICATIONS

This application is a National Stage application under 35 U.S.C. § 371 of International Application No. PCT/JP2019/041192, having an International Filing Date of Oct. 18, 2019, which claims priority to Japanese Application Serial No. 2018-200427, filed on Oct. 24, 2018. The disclosure of the prior application is considered part of the disclosure of this application, and is incorporated in its entirety into this application.

TECHNICAL FIELD

The present invention relates to a wireless LAN communication system, an access point communication quality determination method, and an information collecting server for determining a communication quality of an access point in a wireless LAN communication system and providing, to a user, information on an access point suitable for connection.

BACKGROUND ART

An internet connection service (free WiFi) utilizing a wireless LAN to enable a person with a terminal (such as a smartphone, tablet, and personal computer) capable of wireless LAN (WiFi) communications to use high-speed internet communications in locations outside his or her home such as a cafe, a station, and a hotel has widely spread (Non Patent Literature 1). To be able to offer stable communication quality by the wireless LAN to users, measures have been implemented such as providing multiple access points, as well as signage displaying "Wi-Fi available" in locations where many people gather such as a shopping mall and an event site.

Specifically, in a related-art wireless LAN communication system, users who have found a sign with a message "Wi-Fi available" indicating that wireless LAN is provided executes processing of connecting to an access point with a good radio wave condition, without being aware of where the access point is.

CITATION LIST

Non Patent Literature

Non Patent Literature 1: How to use the TOKYO FREE Wi-Fi, http://www.wifi-tokyo.jp/ja/mail.html

SUMMARY OF THE INVENTION

Technical Problem

Incidentally, when a connection to a free WiFi access point is attempted, the connection may not be established, or even if the connection is established, the speed may be slow. This results in a long waiting time until a web page is displayed. Thus, a time required for completing the displaying exceeds a maximum acceptable waiting time. When this happens, a problem such as interruption of wireless LAN service being utilized occurs.

However, users are currently unaware of which access point he or she should be connected for smoothly connecting to the wireless LAN service, or whether a web page can be displayed within the maximum acceptable waiting time after the connection.

The present invention provides a wireless LAN communication system, an access point communication quality determination method, and an information collecting server enabling determination of communication quality of an access point in a wireless LAN communication system and provision, to a user, of information on an access point suitable for connection.

Means for Solving the Problem

A wireless LAN communication system according to a first aspect of the present invention includes a plurality of access points configured to output information on a connected unit count indicating number of currently connected wireless LAN terminals, and an information collecting server configured to input the information on the connected unit count from an access point of the plurality of access points, calculate a connected unit count ratio that is a ratio of a current connected unit count to a maximum connected unit count of the access point, determine whether communication quality is good or bad for each of the plurality of access points based on the connected unit count ratio, and execute processing of externally displaying or notifying a result that is determined.

A wireless LAN communication system according to a second aspect of the present invention includes a plurality of access points configured to communicate with a subordinate wireless LAN terminal, an information collecting device configured to collect a frame respectively transmitted and received between the plurality of access points and the wireless LAN terminal, and extract information on communication quality of an access point of the plurality of access points from a header of the frame, and an information collecting server configured to acquire the information on the communication quality of the access point from the information collecting device, analyze the information to determine whether the communication quality is good or bad for each of the plurality of access points, and execute processing of externally displaying or notifying a result that is determined.

In the wireless LAN communication system according to the second aspect of the present invention, the information collecting device is configured to extract, as the information on the communication quality of the access point, information for calculating channel usage time from the header of the frame, and output the information for calculating the channel usage time to the information collecting server, and the information collecting server is configured to calculate a channel usage ratio that is a ratio of the channel usage time of the access point in a predetermined period, and determine whether the communication quality is good or bad based on the channel usage ratio.

In the wireless LAN communication system according to the second aspect, the information collecting device is configured to extract, as the information on the communication quality of the access point, an MCS value from the header of the frame, and output the MCS value to the information collecting server, and the information collecting server is configured to calculate an average value of the MCS value in a predetermined period, and determine whether the communication quality is good or bad based on the average value of the MCS value.

In the wireless LAN communication system according to the second aspect of the present invention, the information collecting device is configured to extract, as the information on the communication quality of the access point, information for calculating channel usage time from the header of the frame, and extract, as the information on the communication quality of the access point, an MCS value from the header of the frame, and output the information for calculating the channel usage time and the MCS value to the information collecting server, and the information collecting server is configured to calculate a channel usage ratio that is a ratio of the channel usage time of the access point in a predetermined period as well as an average value of the MCS value in the predetermined period, and determine whether the communication quality is good or bad based on the channel usage ratio and the average value of the MCS value.

In the wireless LAN communication system according to the second aspect, the information collecting device is configured to extract, as the information on the communication quality of the access point, a retry count from the header of the frame, and output the retry count to the information collecting server, and the information collecting server is configured to calculate a retry ratio in a predetermined period, and determine whether the communication quality is good or bad based on the retry ratio.

An access point communication quality determination method according to a third aspect of the present invention includes, by a plurality of access points, outputting information on a connected unit count indicating number of currently connected wireless LAN terminals to an information collecting server, and, by the information collecting server, inputting the information on the connected unit count from an access point of the plurality of access points, calculating a connected unit count ratio that is a ratio of a current connected unit count to a maximum connected unit count of the access point, determining whether communication quality is good or bad for each of the plurality of access points based on the connected unit count ratio, and executing processing of externally displaying or notifying a result that is determined.

An access point communication quality determination method according to a fourth aspect of the present invention includes, by an information collecting device configured to collect a frame respectively transmitted and received between a plurality of access points and a subordinate wireless LAN terminal, extracting information on communication quality of an access point of the plurality of access points from a header of the frame and outputting the information on the communication quality of the access point to an information collecting server, and, by the information collecting server, acquiring and analyzing, as the information on the communication quality of the access point, a channel usage ratio, an MCS value, or a retry count from the information collecting device, determining whether the communication quality is good or bad for each of the plurality of access points, and executing processing of externally displaying or notifying a result that is determined.

An information collecting server configured to transmit and receive, between a plurality of access points and the information collecting server, information on a connected unit count indicating number of wireless LAN terminals currently connected to each of the plurality of access points, and determine communication quality of each of the plurality of access points according to a fifth aspect of the present invention includes a unit configured to input the information on the connected unit count from an access point of the plurality of access points, calculate a connected unit count ratio that is a ratio of a current connected unit count to a maximum connected unit count of the access point, determine whether the communication quality is good or bad for each of the plurality of access points based on the connected unit count ratio, and execute processing of externally displaying or notifying a result that is determined.

An information collecting server configured to collect a frame respectively transmitted and received between a plurality of access points and a subordinate wireless LAN terminal, acquire information on communication quality of each of the plurality of access points from a header of the frame, and determine the communication quality of each of the plurality of access points according to a sixth aspect of the present invention includes a unit configured to analyze, as the information on the communication quality of an access point of the plurality of access points, a channel usage ratio, an MCS value, or a retry count, determine whether the communication quality is good or bad for each of the plurality of access points, and execute processing of externally displaying or notifying a result that is determined.

Effects of the Invention

According to the present invention, the connected unit count indicating the number of wireless LAN terminals connected to an access point is output to the information collecting server, or the information collecting device acquires, as the information on the communication quality of the access point, the information (frame length and transmission time) for calculating the channel usage time, the MCS value, or the retry count from a frame transmitted and received between the access point and the wireless LAN terminal, and outputs the information to the information collecting server. The information collecting server can determine whether the communication quality of each access point is good or bad by calculating the connected unit count ratio of the wireless LAN terminals, or calculating the channel usage ratio, the average value of the MCS value or the retry ratio in the predetermined period, and comparing each value calculated with a predetermined threshold value, for example.

Furthermore, through externally displaying or notifying information indicating whether the communication quality of each access point is good or bad, the user can find an access point to which connection can be easily established.

DESCRIPTION OF EMBODIMENTS

Figure 1:
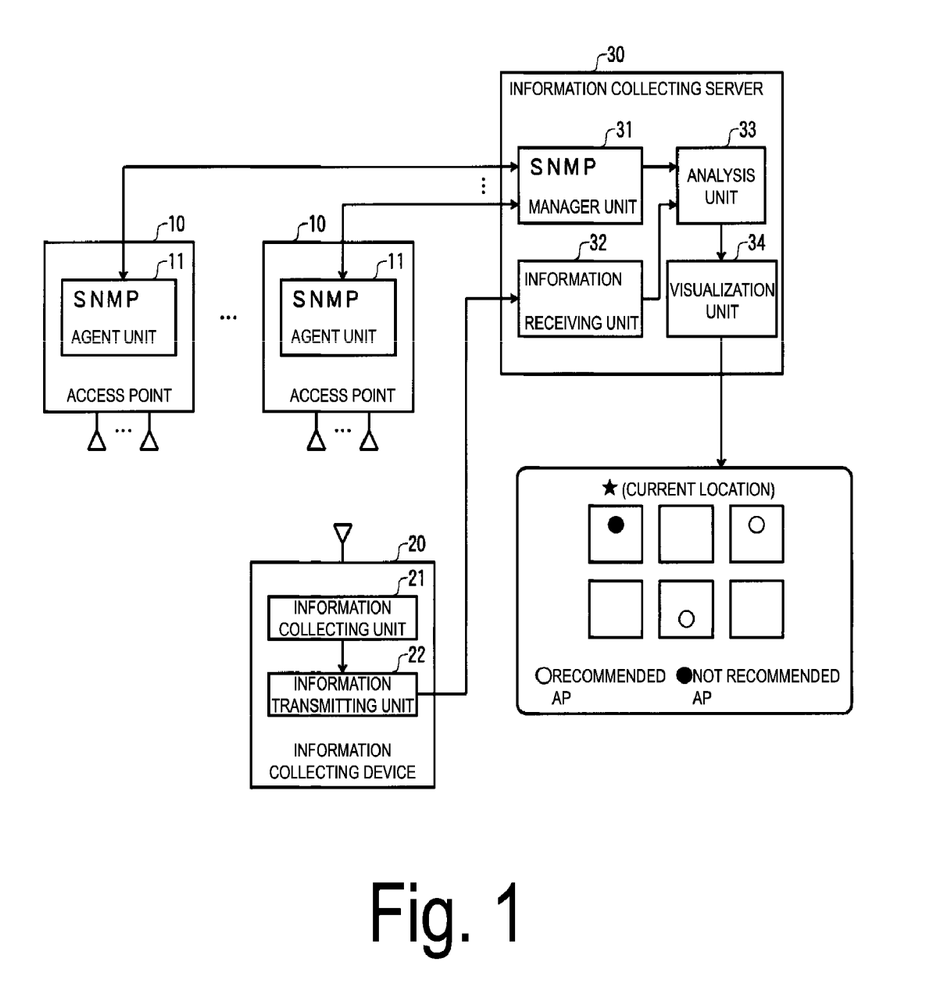
FIG. 1 is a diagram illustrating a configuration example of a wireless LAN communication system according to the present invention.

FIG. 1 illustrates a configuration example of a wireless LAN communication system according to the present invention.

In FIG. 1, a wireless LAN communication system of the present invention includes access points 10, an information collecting device 20, and an information collecting server 30.

The access point 10 includes a simple network management protocol (SNMP) agent unit 11 that monitors wireless LAN communication devices using SNMP. The SNMP agent unit 11 transmits information requested from an SNMP manager unit 31 of the information collecting server 30, to the information collecting server 30. Note that a function and the like for the access point 10 to communicate with a subordinate wireless LAN terminal (not illustrated) is omitted.

The information collecting device 20 includes an information collecting unit 21 and an information transmitting unit 22. The information collecting unit 21 collects an 802.11 frame of a designated channel transmitted and received between the access point 10 and the wireless LAN terminal, extracts required information therefrom, and transmits the information from the information transmitting unit 22 to the information collecting server 30.

The information collecting server 30 includes the SNMP manager unit 31, an information receiving unit 32, an analysis unit 33, and a visualization unit 34, analyzes the communication quality of the access point 10 on the basis of the information received from the access point 10 and the information collecting device 20, and outputs information (recommended/not recommended) indicating whether good communication quality and easily connection can be achieved.

The SNMP manager unit 31 receives information transmitted from the SNMP agent unit 11 of the access point 10, and transmits the information to the analysis unit 33. The information receiving unit 32 receives the information transmitted by the information collecting device 20, and transmits the information to the analysis unit 33.

The analysis unit 33 analyzes the communication quality of the access point on the basis of the information received, and transmits the information indicating a recommended/not recommended access point as the analysis result to the visualization unit 34, as in flowcharts described in Examples 1 to 5 described below. Here, this recommended access point is one that can provide a user with a comfortable wireless LAN service featuring good communication quality and easy connection. The visualization unit 34 creates a file for visualizing the recommended access point on the basis of the analysis result. The visualization unit 34 causes a large display, a user's smartphone, or the like, to display a recommended or not recommended access point to provide the information to the user of the wireless LAN service.

EXAMPLE 1

Figure 2:
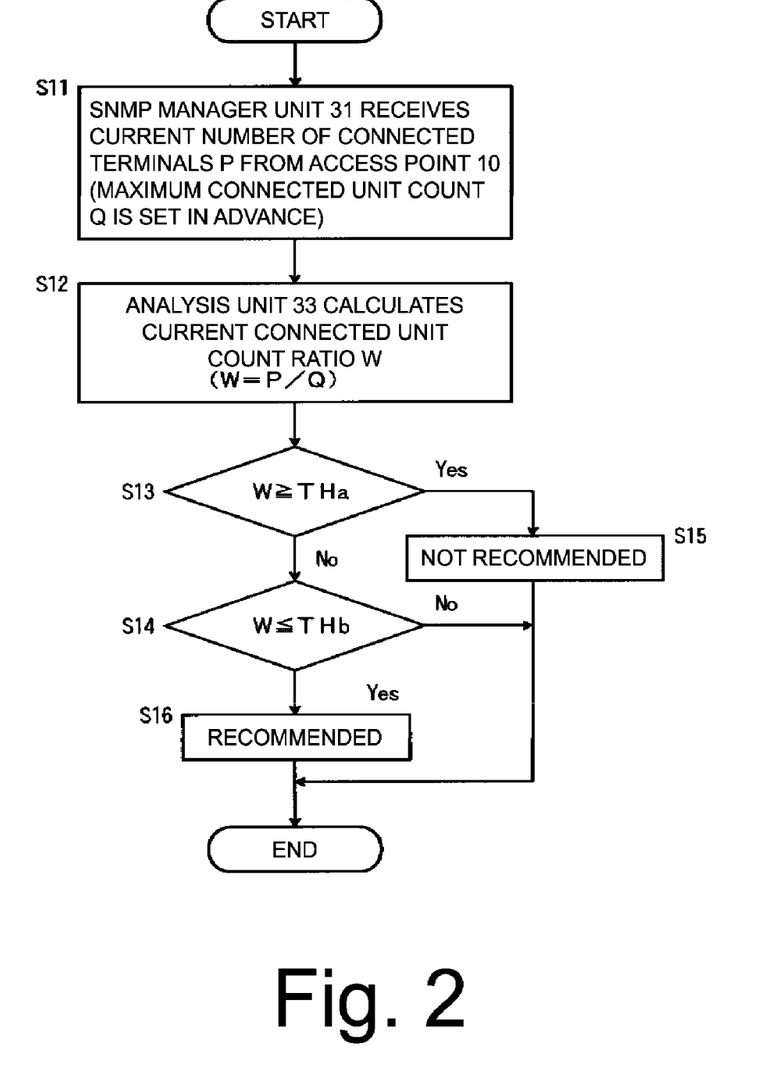
FIG. 2 is a flowchart illustrating an example of a procedure of processing executed by an information collecting server 30 according to Example 1.

FIG. 2 illustrates an example of a procedure of processing executed by the information collecting server 30 according to Example 1.

In FIG. 2, the SNMP manager unit 31 receives information on a current connected unit count P from the access point 10 that is an evaluation target using the SNMP (S11). Since the maximum connected unit count Q is an invariable value, a network administrator sets the value in advance in the information collecting server 30. The analysis unit 33 calculates a current terminal connection ratio W=P/Q (S12), and compares the terminal connection ratio W with predetermined threshold values THa and THb (S13 and S14). Here, THa>THb.

When W≥THa, the analysis unit 33 determines that the terminal connection ratio W of the access point 10 that is the evaluation target is high, and that the access point is not recommended (S15). When W≤THb, the terminal connection ratio W of the access point 10 as the evaluation target is determined to be not at or close to the limit, whereby the access point is determined to be recommended (S16). Note that when THb<W<THa, the analysis unit 33 suspends the determination of deprecation or recommendation for the access point. On the other hand, when THa=THb, the determination is not suspended, and the result of either deprecation or recommendation is obtained.

EXAMPLE 2

Figure 3:
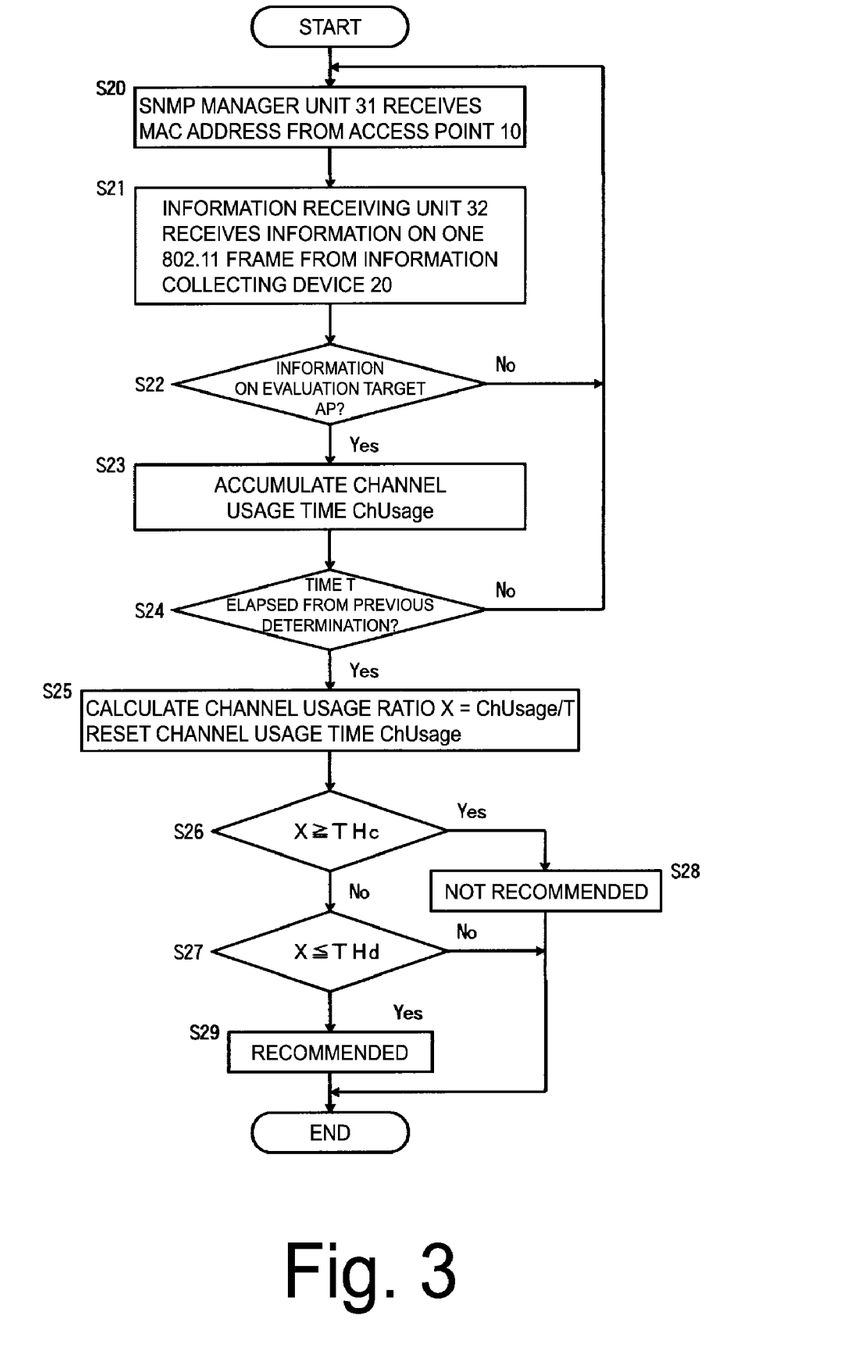
FIG. 3 is a flowchart illustrating an example of a procedure of processing executed by the information collecting server 30 according to Example 2.

FIG. 3 illustrates an example of a procedure of processing executed by the information collecting server 30 according to Example 2.

In FIG. 3, the SNMP manager unit 31 receives a MAC address from the access point 10 that is an evaluation target using the SNMP (S20). When collecting one 802.11 frame, the information collecting device 20 extracts the MAC address, the frame length, and the transmission speed in the header, and transmits these pieces of information to the information collecting server 30, and the information receiving unit 32 of the information collecting server 30 receives the information (S21).

The analysis unit 33 of the information collecting server 30 checks whether the MAC address of the information on the 802.11 frame received from the information collecting device 20 matches the MAC address of the access point 10 that is the evaluation target (S22). When the MAC address matches, it is determined that the information is information on the access point 10 that is the evaluation target (S22, Yes), and a channel usage time ChUsage is accumulated (S23). Specifically, the channel usage time ChUsage up to the previous determination and the current channel usage time (=frame length/transmission speed) are added. Here, whether a time T has elapsed from the previous recommended/not recommended determination is determined (S24), and the channel usage time ChUsage is repeatedly accumulated until the time T elapses. When the time T elapses, a channel usage ratio X=ChUsage/T at the time T is calculated, and the channel usage time ChUsage is reset (S25). Thus, the channel usage times ChUsage from the previous determination are accumulated until the time T elapses, and the accumulated value is replaced with the channel usage ratio X at the point when the time T elapses.

The analysis unit 33 compares the channel usage ratio X with predetermined threshold values THc and THd (S26, S27). Here, THc>THd.

When X≥THc, the analysis unit 33 determines that the channel usage ratio X of the access point 10 that is the evaluation target is high, and that the access point is not recommended (S28). When W≤THd, the channel usage ratio X of the access point 10 as the evaluation target is determined to be not at or close to the limit, and the access point is determined to be recommended (S29). Note that when THd<X<THc, the analysis unit 33 suspends the determination of deprecation or recommendation for the access point. On the other hand, when THc=THd, the determination is not suspended, and the result of either deprecation or recommendation is obtained.

EXAMPLE 3

Figure 4:
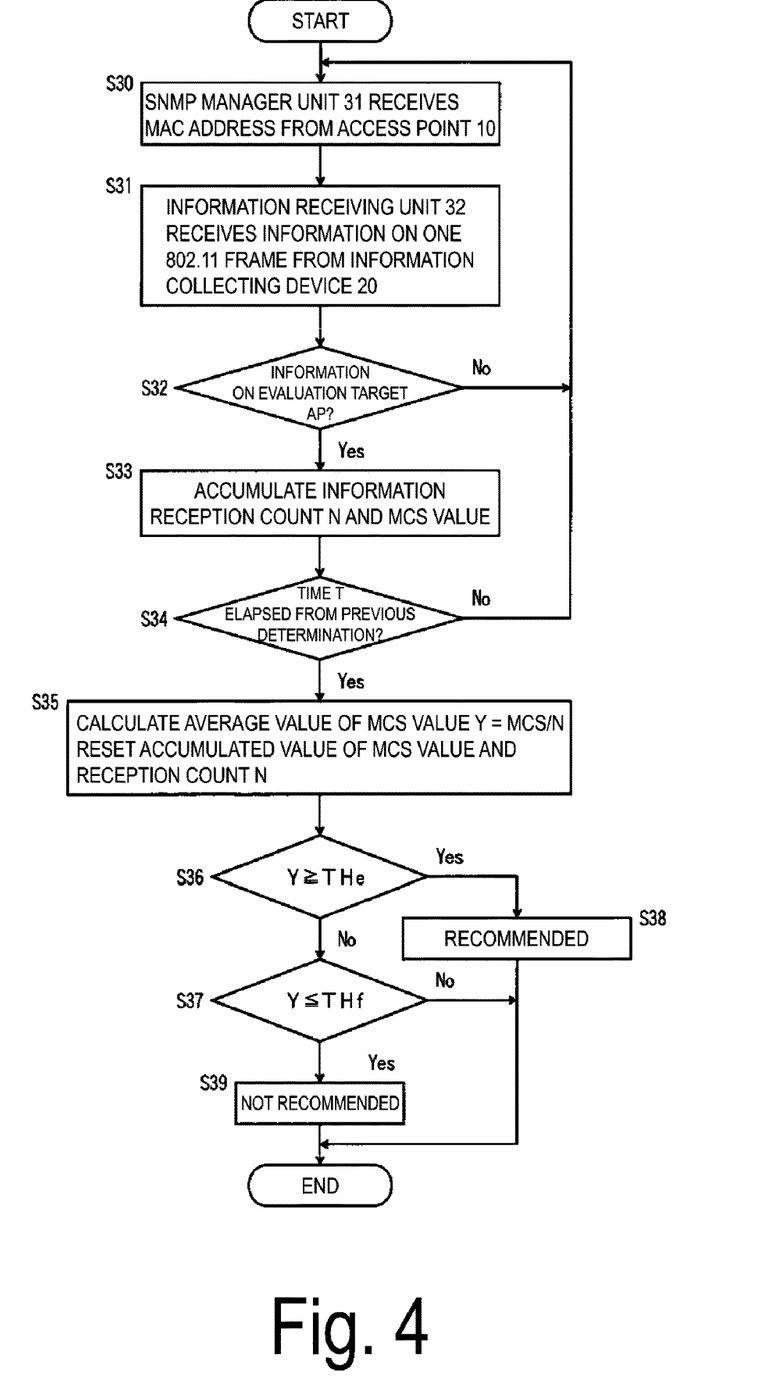
FIG. 4 is a flowchart illustrating an example of a procedure of processing executed by the information collecting server 30 according to Example 3.

FIG. 4 illustrates an example of a procedure of processing executed by the information collecting server 30 according to Example 3.

In FIG. 4, the SNMP manager unit 31 receives a MAC address from the access point 10 that is an evaluation target using the SNMP (S30). When collecting one 802.11 frame, the information collecting device 20 extracts the MAC address and a modulation and coding scheme (MCS) value from a header, and transmits these pieces of information to the information collecting server 30, and the information receiving unit 32 of the information collecting server 30 receives the information (S31).

The analysis unit 33 of the information collecting server 30 checks whether the MAC address of the information on the 802.11 frame received from the information collecting device 20 matches the MAC address of the access point 10 that is the evaluation target (S32). When the MAC address matches, it is determined that the information is information on the access point 10 that is the evaluation target (S32, Yes), and a reception count N of the information and the MCS value are accumulated (S33). Specifically, the reception count N up to the previous reception is incremented by 1, and the MCS value up to the previous determination and the current MCS value (MCS arv) are added. Here, whether time T has elapsed from the previous recommended/not recommended determination is determined (S34), and the information reception count N and the MCS value are repeatedly accumulated until the time T elapses. When the time T elapses, an average value Y=MCS/N of the MCS values at the point of the reception count N is obtained, and the accumulated values of the MCS value and the reception count N are reset (S35). Thus, the MCS values from the previous determination are accumulated until the time T elapses, and the accumulated value is replaced with the average value Y of the MCS values at the point when the time T elapses.

The analysis unit 33 compares the average value Y of the MCS values with predetermined threshold values THe and THf (S36, S37). Here, THe>THf.

When Y≥THe, the analysis unit 33 determines that the average value Y of the MCS values of the access point 10 that is the evaluation target is high indicating that communications can be favorably performed, and that the access point is recommended (S38). When Y≤THf, it is determined that the average value Y of the MCS values of the access point 10 that is the evaluation target is low indicating that communications cannot be favorably performed, and the access point is determined to be not recommended (S39). Note that when THe<Y<THf, the analysis unit 33 suspends the determination of deprecation or recommendation for the access point. On the other hand, when THe=THf, the determination is not suspended, and the result of either deprecation or recommendation is obtained.

EXAMPLE 4

Figure 5:
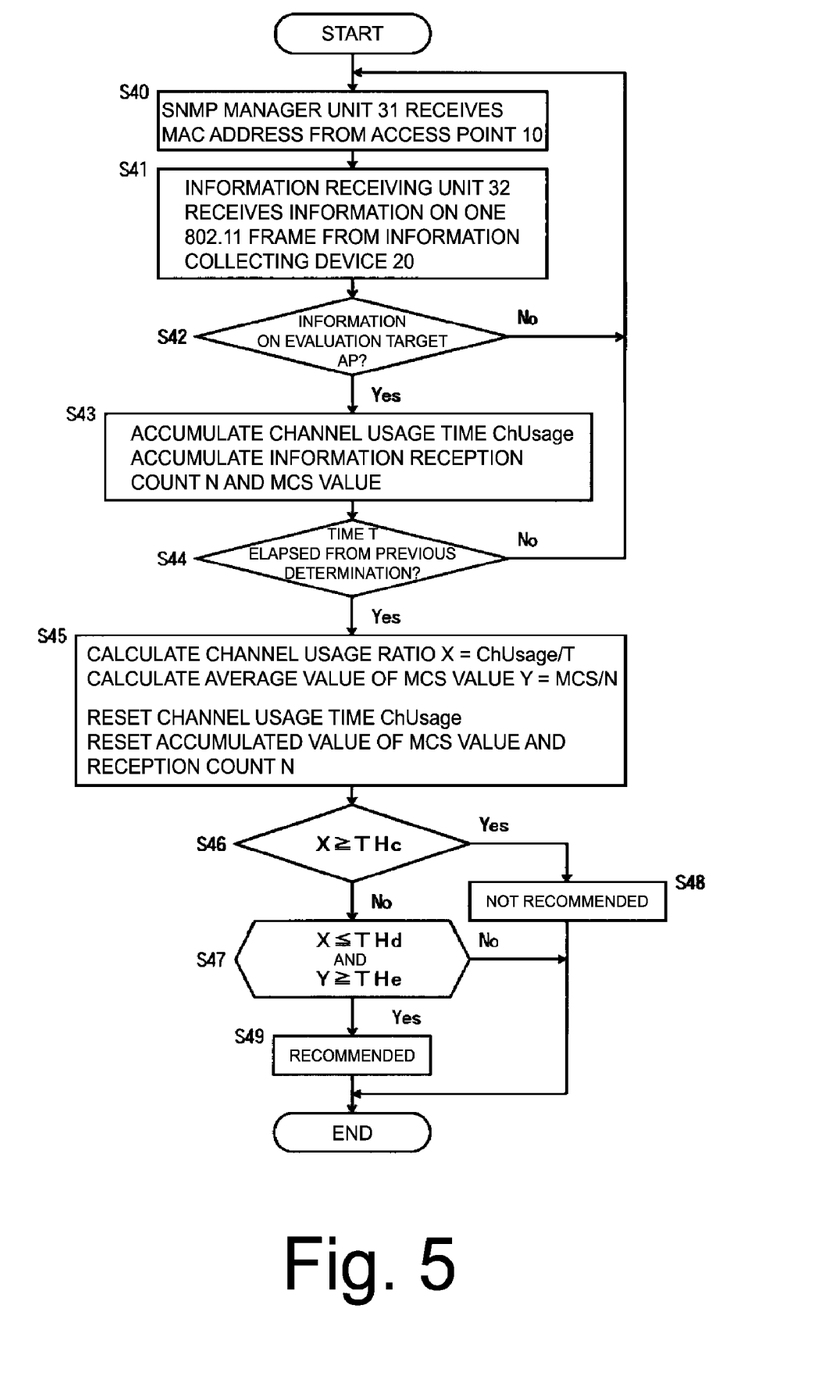
FIG. 5 is a flowchart illustrating an example of a procedure of processing executed by the information collecting server 30 according to Example 4.

FIG. 5 illustrates an example of a procedure of processing executed by the information collecting server 30 according to Example 4.

In FIG. 5, the SNMP manager unit 31 receives a MAC address from the access point 10 that is an evaluation target using the SNMP (S40). When collecting one 802.11 frame, the information collecting device 20 extracts the MAC address, the frame length, the transmission speed, and the MCS value in the header, and transmits these pieces of information to the information collecting server 30, and the information receiving unit 32 of the information collecting server 30 receives the information (S41).

The analysis unit 33 of the information collecting server 30 checks whether the MAC address of the information on the 802.11 frame received from the information collecting device 20 matches the MAC address of the access point 10 that is the evaluation target (S42). When the MAC address matches, it is determined that the information is information on the access point 10 that is the evaluation target (S42, Yes), and the channel usage time ChUsage is accumulated as in Example 2, and the reception count N of the information and the MCS value are accumulated as in Example 3 (S43). Here, whether the time T has elapsed from the previous recommended/not recommended determination is determined (S44), and the channel usage time ChUsage, the information reception count N, and the MCS value are repeatedly accumulated until the time T is elapses. When the time T elapses, the channel usage ratio X=ChUsage/T at the time T and an average value Y=MCS/N of the MCS values at the point of the reception count N are obtained, and the channel usage time ChUsage, the accumulated value of the MCS value and the reception count N are reset (S45).

The analysis unit 33 compares the channel usage ratio X with the predetermined threshold values THc and THd and compares the average value Y of the MCS values with the predetermined threshold value THe (S46, S47). Here, THc>THd.

When X≥THc, the analysis unit 33 determines that the channel usage ratio X of the access point 10 that is the evaluation target is high, and that the access point is not recommended (S48). When X≤THd and Y≥THe, the channel usage ratio X is determined to be not at or close to the limit, and the average value Y of the MCS values of the access point 10 that is the evaluation target is determined to be high indicating that communications can be favorably performed, and thus the access point is determined to be recommended (S49). Note that in the case of THd<X<THc or Y<THe, the analysis unit 33 suspends the determination of deprecation or recommendation for the access point.

EXAMPLE 5

Figure 6:
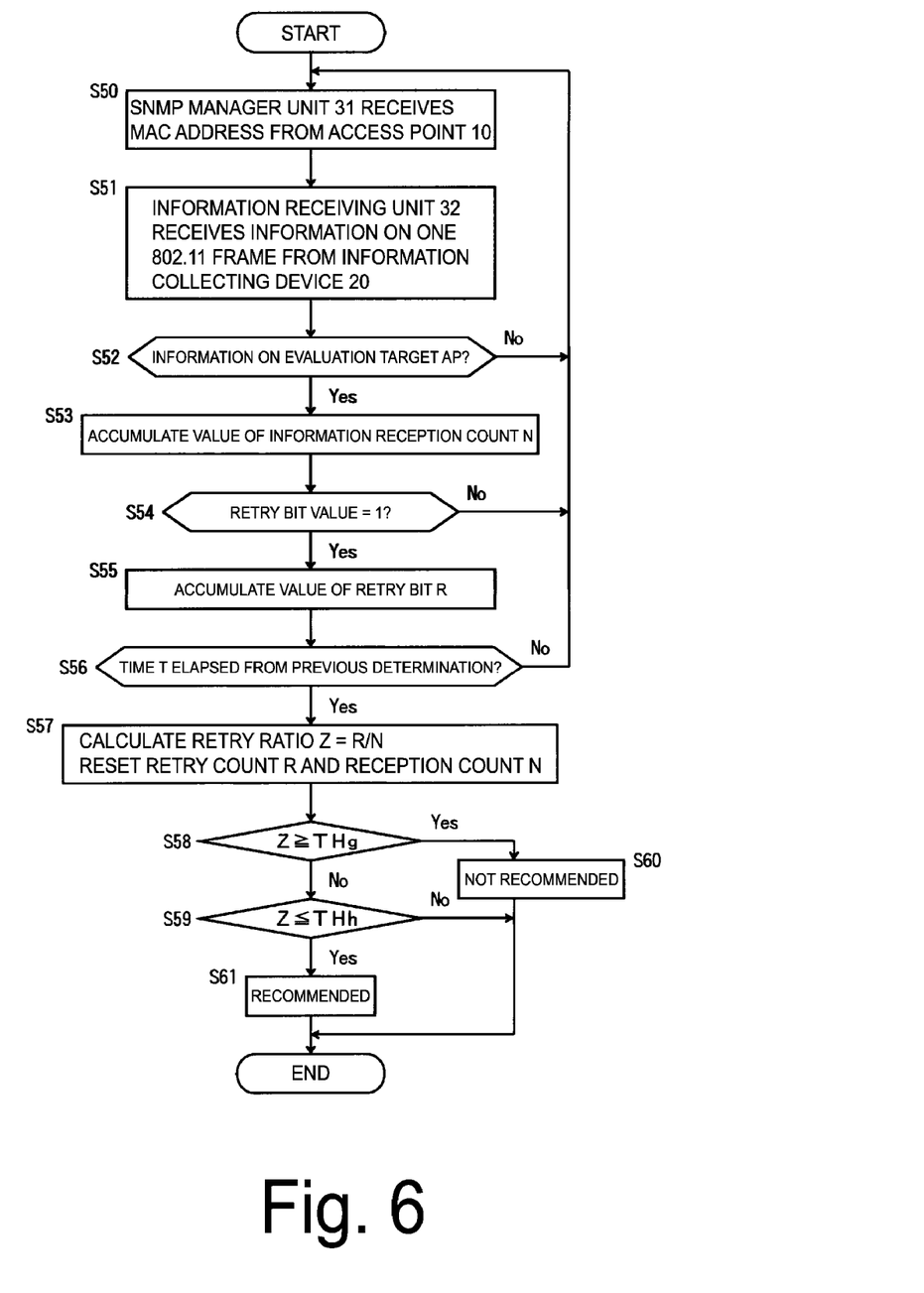
FIG. 6 is a flowchart illustrating an example of a procedure of processing executed by the information collecting server 30 according to Example 5.

FIG. 6 illustrates an example of a procedure of processing executed by the information collecting server 30 according to Example 5.

In FIG. 6, the SNMP manager unit 31 receives a MAC address from the access point 10 that is an evaluation target using the SNMP (S50). When collecting one 802.11 frame, the information collecting device 20 extracts the MAC address and a retry bit value in the header, and transmits these pieces of information to the information collecting server 30, and the information receiving unit 32 of the information collecting server 30 receives the information (S51).

The analysis unit 33 of the information collecting server 30 checks whether the MAC address of the information on the 802.11 frame received from the information collecting device 20 matches the MAC address of the access point 10 that is the evaluation target (S52). When the MAC address matches, the information is determined to be information on the access point 10 that is the evaluation target, and the reception count N of the information is accumulated (S53). Furthermore, when the acquired retry bit valued is 1 indicating a retransmitted frame (S54), a retry count R is accumulated (S55). Here, whether the time T has elapsed from the previous recommended/not recommended determination is determined (S56), and the information reception count N and the retry count R are repeatedly accumulated until the time T elapses. When the time T elapses, a retry ratio Z=R/N at the point of the reception count N is obtained, and the retry count R and the reception count N are reset (S57).

The analysis unit 33 compares the retry ratio Z with a predetermined threshold value THg and THh (S58, S59). Here, THg>THh.

When X≥THg, the analysis unit 33 determines that the retry ratio Z of the access point 10 that is the evaluation target is high indicating that communications cannot be favorably performed, and that the access point is not recommended (S60). When Z≤THh, it is determined that the retry ratio Z of the access point 10 that is the evaluation target is low indicating that communications can be favorably performed, and that the access point is recommended (S61). Note that when THg<Z<THh, the analysis unit 33 suspends the determination of deprecation or recommendation for the access point. On the other hand, when THg=THh, the determination is not suspended, and the result of either deprecation or recommendation is obtained.

REFERENCE SIGNS LIST

10 Access point
11 SNMP agent unit
20 Information collecting device
21 Information collecting unit
22 Information transmitting unit
30 Information collecting server
31 SNMP manager unit
32 Information receiving unit
33 Analysis unit
34 Visualization unit

The invention claimed is:

1. A wireless LAN communication system comprising:
a plurality of access points configured to output information on a connected unit count indicating number of currently connected wireless LAN terminals; and
an information collecting server comprising a memory device storing instructions and a processor configured to execute the instructions to input the information on the connected unit count from an access point of the plurality of access points, calculate a connected unit count ratio that is a ratio of a current connected unit count to a maximum connected unit count of the access point, determine a respective connection recommendation for each of the plurality of access points based on the connected unit count ratio, and execute processing of externally displaying or notifying a result that is determined, wherein determining the respective connection recommendation comprises, for the respective access point:
comparing the respective connected unit count ratio of the respective access point to a first threshold;
comparing the respective connected unit count ratio of the respective access point to a second threshold that is greater than the first threshold;
in response to the respective connected unit being greater than or equal to the second threshold, determining not to recommend connecting to the respective access point;
in response to the respective connected unit being less than or equal to the first threshold, determining to recommend connecting to the respective access point; and
in response to the respective connected unit being greater than the first threshold and less than the second threshold, suspending the determination.

2. The wireless LAN communication system according to claim 1, wherein
the plurality of access points are configured to communicate with a subordinate wireless LAN terminal; and
the system further comprising:
an information collecting device configured to collect a frame respectively transmitted and received between the plurality of access points and the subordinate wireless LAN terminal, and extract information on communication quality of an access point of the plurality of access points from a header of the frame.

3. The wireless LAN communication system according to claim 2, wherein
the information collecting device is configured to extract, as the information on the communication quality of the access point, information for calculating channel usage time from the header of the frame, and output the information for calculating the channel usage time to the information collecting server, and
the information collecting server is configured to calculate a channel usage ratio that is a ratio of the channel usage time of the access point in a predetermined period, and determine whether the communication quality is good or bad based on the channel usage ratio.

4. The wireless LAN communication system according to claim 2, wherein
the information collecting device is configured to extract, as the information on the communication quality of the access point, an MCS value from the header of the frame, and output the MCS value to the information collecting server, and
the information collecting server is configured to calculate an average value of the MCS value in a predetermined period, and determine whether the communication quality is good or bad based on the average value of the MCS value.

5. The wireless LAN communication system according to claim 2, wherein
the information collecting device is configured to extract, as the information on the communication quality of the access point, information for calculating channel usage time from the header of the frame, and extract, as the information on the communication quality of the access point, an MCS value from the header of the frame, and output the information for calculating the channel usage time and the MCS value to the information collecting server, and
the information collecting server is configured to calculate a channel usage ratio that is a ratio of the channel usage time of the access point in a predetermined period as well as an average value of the MCS value in the predetermined period, and determine whether the communication quality is good or bad based on the channel usage ratio and the average value of the MCS value.

6. The wireless LAN communication system according to claim 2, wherein the information collecting device is configured to extract, as the information on the communication quality of the access point, a retry count from the header of the frame, and output the retry count to the information collecting server, and the information collecting server is configured to calculate a retry ratio in a predetermined period, and determine whether the communication quality is good or bad based on the retry ratio.

7. An access point communication quality determination method comprising:

by a plurality of access points, outputting information on a connected unit count indicating number of currently connected wireless LAN terminals to an information collecting server; and by the information collecting server, inputting the information on the connected unit count from an access point of the plurality of access points, calculating a connected unit count ratio that is a ratio of a current connected unit count to a maximum connected unit count of the access point, determining a respective connection recommendation for each of the plurality of access points based on the connected unit count ratio, and executing processing of externally displaying or notifying a result that is determined, wherein determining the respective connection recommendation comprises, for the respective access point:

comparing the respective connected unit count ratio of the respective access point to a first threshold;

comparing the respective connected unit count ratio of the respective access point to a second threshold that is greater than the first threshold;

in response to the respective connected unit being greater than or equal to the second threshold, determining not to recommend connecting to the respective access point;

in response to the respective connected unit being less than or equal to the first threshold, determining to recommend connecting to the respective access point; and in response to the respective connected unit being greater than the first threshold and less than the second threshold, suspending the determination.

8. The access point communication quality determination method of claim 7, further comprising:

by an information collecting device configured to collect a frame respectively transmitted and received between the plurality of access points and a subordinate wireless LAN terminal, extracting information on communication quality of an access point of the plurality of access points from a header of the frame and outputting the information on the communication quality of the access point to the information collecting server.

9. The access point communication quality determination method according to claim 8, further comprising:

by the information collecting server, acquiring and analyzing, as the information on the communication quality of the access point, a channel usage ratio, an MCS value, or a retry count from the information collecting device, determining whether the communication quality is good or bad for each of the plurality of access points, and executing processing of externally displaying or notifying a result that is determined.

10. An information collecting server configured to transmit and receive, between a plurality of access points and the information collecting server, information on a connected unit count indicating number of wireless LAN terminals currently connected to each of the plurality of access points, and determine communication quality of each of the plurality of access points, the information collecting server comprising:

a memory device storing instructions and a processor configured to execute the instructions to input the information on the connected unit count from an access point of the plurality of access points, calculate a connected unit count ratio that is a ratio of a current connected unit count to a maximum connected unit count of the access point, determine a respective connection recommendation for each of the plurality of access points based on the connected unit count ratio, and execute processing of externally displaying or notifying a result that is determined, wherein determining the respective connection recommendation comprises, for the respective access point:

comparing the respective connected unit count ratio of the respective access point to a first threshold;

comparing the respective connected unit count ratio of the respective access point to a second threshold that is greater than the first threshold;

in response to the respective connected unit being greater than or equal to the second threshold, determining not to recommend connecting to the respective access point;

in response to the respective connected unit being less than or equal to the first threshold, determining to recommend connecting to the respective access point; and in response to the respective connected unit being greater than the first threshold and less than the second threshold, suspending the determination.

11. The information collecting server of claim 10, wherein the information collecting server is configured to collect a frame respectively transmitted and received between the plurality of access points and a subordinate wireless LAN terminal, acquire information on communication quality of each of the plurality of access points from a header of the frame, and determine the communication quality of each of the plurality of access points, wherein the unit of the information collecting server is configured to analyze, as the information on the communication quality of an access point of the plurality of access points, a channel usage ratio, an MCS value, or a retry count, to determine whether the communication quality is good or bad for each of the plurality of access points, and execute processing of externally displaying or notifying a result that is determined.

* * * * *